May 24, 1960 C. J. SPERR, JR 2,937,729
MAGNETIC FRICTION CLUTCH WITH STATIONARY FIELD
Filed Nov. 22, 1957 2 Sheets-Sheet 1
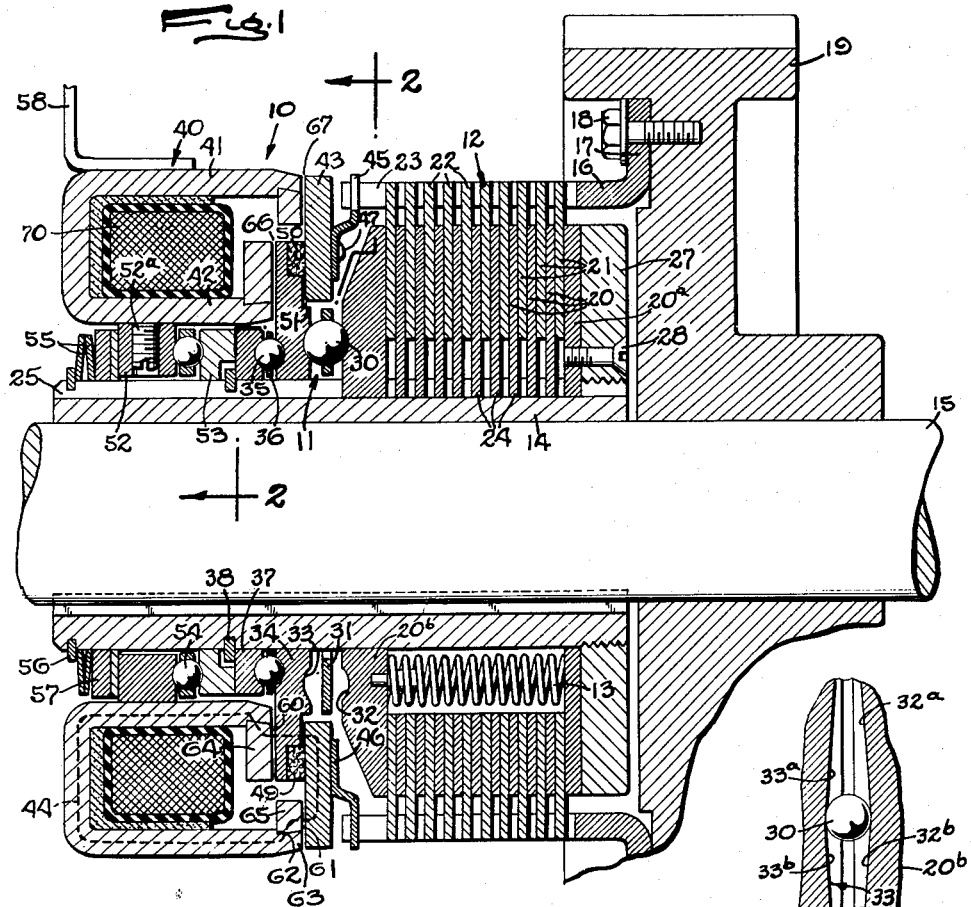
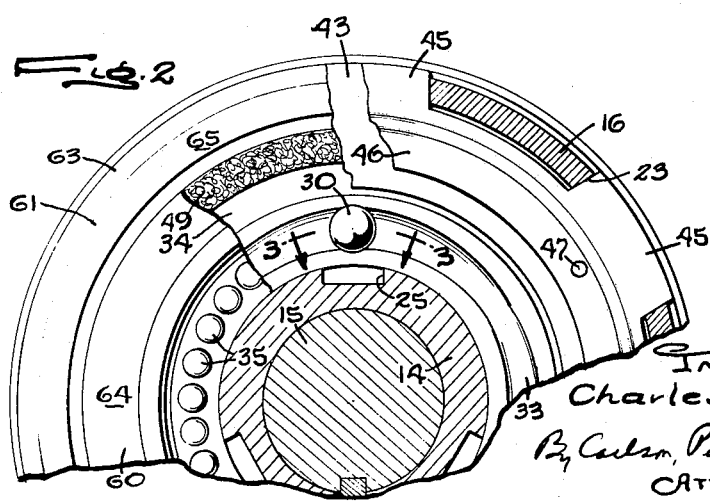
INVENTOR
Charles J. Sperr Jr.
By Carlson, Pitzner, Hubbard & Wolfe
ATTORNEY

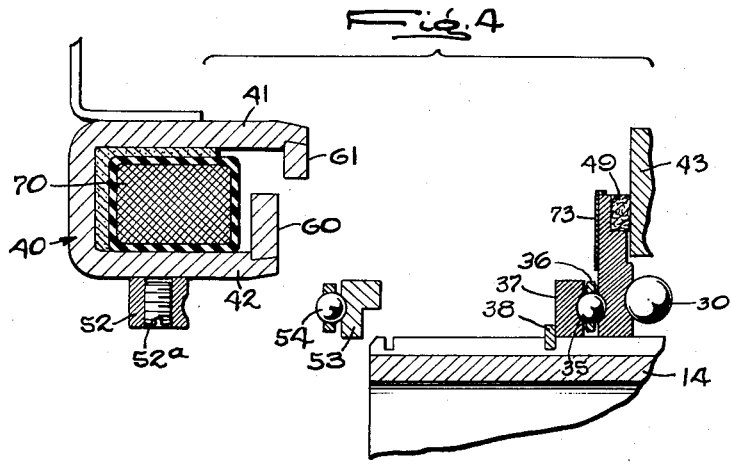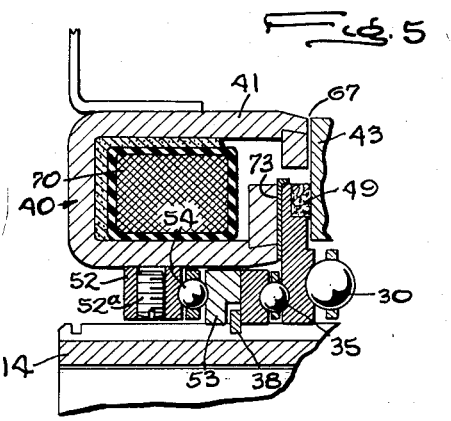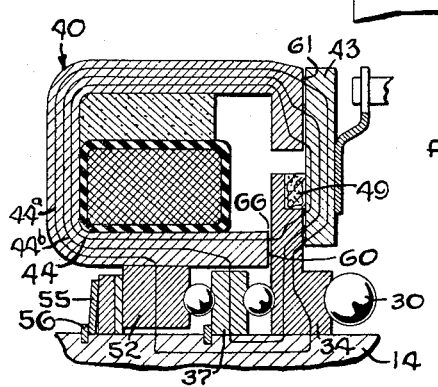

United States Patent Office 2,937,729
Patented May 24, 1960

2,937,729

MAGNETIC FRICTION CLUTCH WITH STATIONARY FIELD

Charles J. Sperr, Jr., Beloit, Wis., assignor to Warner Electric Brake & Clutch Company, South Beloit, Ill., a corporation of Illinois Filed Nov. 22, 1957, Ser. No. 698,148

4 Claims. (Cl. 192—84)

This invention relates to a magnetic clutch having a stationarily mounted magnet core and relatively rotatable field and armature rings having friction surfaces which are drawn into axial gripping engagement by magnetic flux threading a toroidal path through the core and rings.

The primary object is to simplify and reduce the cost of manufacture of a clutch of the above character as compared with prior constructions while, at the same time, decreasing the diameter and therefore the inertia of the driven clutch ring.

Another object is to employ only one air gap in the toroidal flux path between the core and the driven clutch ring and to extend this gap axially instead of radially.

A more detailed object is to axially offset the stationary pole faces of the magnet core so as to permit the use of armature and driven rings which are substantially flat.

The invention also resides in the novel mounting of the magnet core to facilitate the establishment of an air gap of fixed width in the flux circuit in spite of dimensional variations in the several associated parts.

Other objects and advantages of the invention will become apparent from the following detailed description taken in connection with the accompanying drawings, in which Figure 1 is a fragmentary diametrical sectional view of a friction clutch adapted to be actuated by a magnetic pilot clutch embodying the novel features of the present invention.

Fig. 2 is a fragmentary sectional view taken along the line 2—2 of Fig. 1.

Fig. 3 is a fragmentary development view taken along the line 3—3 of Fig. 2.

Fig. 4 is a fragmentary exploded view of the improved clutch in the course of its assembly.

Fig. 5 is a similar view with the parts joined together.

Fig. 6 is a fragmentary sectional view similar to Fig. 1 showing a modification of the flux path.

The improved magnetic clutch indicated generally at 10 is particularly adapted for use as a pilot device for deriving torque to actuate a cam mechanism 11 for applying and releasing a main clutch 12 of the multiple disk type. Accordingly, the improved clutch is shown for purposes of illustration associated with such a main clutch. It is to be understood, however, that I do not intend to limit the invention by such illustrative disclosure but aim to cover all modifications and alternative constructions and uses of the improved clutch falling within the spirit and scope of the invention as expressed in the appended claims.

Herein, the driven element of the main clutch 12 takes the form of a sleeve 14 keyed on a shaft 15 and extending axially through the main clutch, the cam mechanism, and the pilot clutch. The driving element is a larger sleeve or cup 16 concentric with one end portion of the driven sleeve and projecting beyond the latter for attachment as through a flange 17 and screws 18 to a drive gear 19 journaled on and supported by the shaft 15.

The main clutch comprises two sets of disks or flat rings 20 and 21 of relatively rigid oil resistant friction material alternating with each other and respectively spline coupled to the inner and outer sleeves 14 and 16. To this end, the stampings forming the driving disks 21 fit loosely within the outer sleeve with squared lugs 22 around their peripheries disposed in slots 23 which extend longitudinally of the inner end portion of the sleeve 16 and are open at the inner end thereof. In a similar way, lugs 24 around the inner edges of the disks 20 are received in squared spline grooves 25 cut in the corresponding end portion of the driven sleeve 14.

The desired clearance between the plates of the main clutch may be obtained by axial adjustment of the terminal disk 20ᵃ which is backed by a disk 27 threaded onto the outer end of the sleeve 14. A screw 28 seated in the disk 27 and threading into the disk 20ᵃ serves to lock the disks together and thus retain any axial position of adjustment of the disk 20ᵃ.

Engagement of the main clutch is effected by the application of pressure axially on the other terminal disk 20ᵇ of the main clutch, this being relatively thick and rigid so as to distribute the actuating pressure uniformly. Upon release of the actuating pressure, the clutch is released by a plurality of coiled compression springs 13 disposed in angularly spaced notches in the clutch disks and acting against the terminal disks 20ᵃ and 20ᵇ to separate the latter.

The cam mechanism 11 comprises three anti-friction elements or balls 30 angularly spaced equal distances apart by a retainer ring 31 and continuously engaging opposed surfaces 32 and 33, one formed on the outer face of the terminal disk 20ᵇ. The other surface is on the inner peripheral portion of an actuator ring 34 surrounding the extended end portion of the sleeve 14 and supported by anti-friction thrust bearings 35 to turn about the clutch axis. The balls of this bearing are spaced by a retainer 36 and ride raceways formed in the back of the ring 34 and the opposed surface of a thrust ring 37 closely fitting around the sleeve extension and rigidly backed by a snap ring 38 seated in the sleeve.

Herein, both of the opposed surfaces 32 and 33 are formed with inclines or ramps 32ᵃ, 32ᵇ, 33ᵃ and 33ᵇ arranged in pairs with the surfaces of each pair converging circumferentially to low points in which the balls are seated as shown in Fig. 3 when the actuator ring 34 is positioned to permit release of the main clutch by the springs 13. As the ring is turned in either direction away from this position, the balls 30 roll up corresponding ones of the ramps, thus moving the disk 20ᵇ axially away from the ring thereby compressing the disks 20 and 21 together and apply the main clutch.

The pilot clutch 10 constituting the present invention may be utilized to advantage in frictionally deriving a torque from the driving element 16 of the main clutch to effect limited angular displacement of the actuator ring 34 for applying the main clutch. As in prior magnetic clutches of the stationary field type, it includes an annular magnetic core 40 having two pole pieces or legs 41, 42 coacting with a rotatable magnetic ring and a generally flat armature or driving ring 43 to form a toroidal path 44 threaded by magnetic flux to draw the armature and the ring 34 into axial gripping engagement.

In prior constructions, the rotatable magnetic ring has been formed with cylindrical parts disposed close to both of the pole legs 41, 42 of the core and usually separated from the latter by cylindrical air gaps concentric with the clutch axis. The present invention aims to simplify the construction of this rotating ring 34 and substantially reduce its size and inertia by exposing the ring to only one of the pole legs of the core through an air gap 66 which is disposed axially instead of radially, the pole face on the other leg of the core being disposed close to the armature ring 43 and preferably separated from the latter by a narrow axial air gap 67.

To the foregoing ends, the armature 43 preferably comprises a flat ring of magnetic iron surrounding and lying substantially in the plane of the balls 30 and spline coupled to the driving cup 16 so as to be supported thereby for free axial floating. The coupling is effected by a substantial number of outwardly projecting fingers 45 fitting into the grooves of the drive cup 16 near the inner or free end of the latter. Herein, these fingers are integral with a stamped sheet metal ring 46 disposed between the main clutch and the armature and secured to the latter by rivets 47. The armature is thus centered on the clutch axis and is free to float axially while it turns with the drive cup.

In carrying out the present invention, the actuator ring 34 is composed of magnetic iron and substantially flat and, as determined by the thrust bearing 35, is disposed in an axial plane offset from but adjacent the armature 43 between the latter and the magnet core 40. A substantial width of the ring outwardly beyond the cam surface 33 thereon overlaps and is disposed opposite the inner edge portion of the armature. One face of the overlapped rings, in this instance, the ring 34, carries an arcuate layer 49 of relatively rigid non-magnetic friction material, such as cork, projecting a few thousandths, for example, .005, of an inch above the face of the ring for axial gripping engagement with the armature ring. Herein, the friction material is set in a groove 50 cut around the outer edge portion of the ring 34 and covers only part of the overlapped width of the rings, the remaining parts being separated by a narrow air gap 51 of sufficient width to impart the necessary flux-carrying capacity to this part of the toroidal flux part.

The magnet core 40 is a hollow annulus generally U-shaped in cross-section supported on the extended end portion of the sleeve 14 at a point outwardly beyond the thrust bearing 35. For a purpose to appear later, a special mounting is employed including a ring 52 closely fitting within the inner pole leg 42 and clamped rigidly to the latter as by a series of angularly spaced set screws 52ª. The inner end of this ring and other ring 53 pressed onto the sleeve 14 adjacent the snap ring 38 form the raceways for balls 54 angularly spaced by a suitable retainer and acting, when the bearing is loaded axially, to support the magnet core and center the same on the clutch axis.

Such axial loading is achieved in the present instance by conical spring washers 55 compressed between an outer snap ring 56 on the sleeve and a spacer 57 journaled on the sleeve and abutting the core ring 52. The entire supporting assembly including the race rings 52 and 53 and the spacer ring 57 and the bearing 54 is compressed axially and held in abutment with the thrust ring 37, the magnet core thus being located and maintained in an accurately defined axial position. The core is held against turning with the sleeve 14 as by an arm 58 secured to the core and bolted or otherwise attached to a suitable support in the final mounting of the clutch.

To dispose one and preferably both of the pole faces 60, 61 of the magnet core axially as contemplated by the present invention and at the same time provide for carrying ample flux to the actuator and armature rings 34 and 43, the free edges of the pole legs 41 and 42 are turned inwardly and outwardly at right angles. The pole faces are formed by the outer axially facing surfaces of these flanges. The latter may as shown be separate rings 64 and 65 of magnetic material seated against shoulders 62 formed around the pole pieces, the rings being fastened to the pole pieces by spinning or otherwise bending end portions 63 of the pole pieces inwardly and against beveled surfaces on the flange rings.

To enable the actuator and armature rings 34 and 43 to be made substantially flat and the overall construction thus simplified, the pole flanges 64 and 65 are offset from each other axially and the inner pole leg 42 thus shortened to dispose the pole faces 60 and 61 close to the backs of the actuator and armature rings. The axial spacing of the pole faces is such that with the supporting bearings axially loaded and the armature drawn against the friction layer 49, the pole faces will be separated from the backs of the rings 34 and 43 by the narrow air gaps 66 and 67 which are about 0.012 and 0.018 inch wide respectively. The width of the outer gap decreases as the engaging friction surfaces wear away in service use.

While the magnetic flux threading the path 44 may be created by a permanent magnet, it is derived in the present instance from a multiple turn winding 70 disposed within and secured to the core 40 between the pole pieces thereof. When an energizing circuit through the winding is closed, magnetic flux threads the well-defined path 44 which, it will be observed, extends axially through three air gaps, namely, the gap 66 between the inner magnet pole face and the actuator ring, the gap 51 between the actuator and armature rings on the inner margin of the overlapped portions thereof, and the outer gap 67 between the armature and the pole face 61. As a result, the armature ring is drawn toward the pole faces thus increasing the pressure of the axial engagement between the armature and the wear ring 49. Such gripping of the rotating armature derives a friction torque which is proportional to the magnitude of the current energizing the winding 70. When the current flow is interrupted, the axial pressure is relieved thus releasing the clutch 10 and allowing the actuator ring 34 to return to the normal position for releasing the main clutch.

By employing only one air gap between the magnet core and the actuator ring 34 and disposing this gap in an axial plane, numerous advantages result particularly when the improved clutch is the pilot actuator for a main clutch. In the first place, the actuator ring 34 may be of relatively small diameter and therefore of low inertia, thus minimizing the danger of the main clutch being applied unintentionally by rapid acceleration of the sleeve 14. Secondly, the construction of the actuator ring is simpler and more economical than in prior stationary field clutches having radial flux transfer gaps. The actuator 34 and the armature 43 may be simple flat rings since the axial offsetting of the pole faces 60 and 61 permits the two rings to be disposed in axially spaced planes. This arrangement also preserves the well defined flux path 44 thus avoiding objectionable by-passing of the flux around the several air gaps. By extending the flux path axially instead of radially through the ring 34, hardening of the latter increases the reluctance of the flux circuit only slightly. For the same reason, the effect of residual magnetism is decreased as compared to prior constructions.

High efficiency of the clutch 10 is achieved by exposing the outer pole face 61 directly to the armature and the gap 67 in an axial plane. The flux threading the latter gap produces an attractive force which augments the flux through the inner gap 66 in drawing the armature and the actuator ring 34 together and thus producing useful torque.

The coupling of the magnet core 40 and its supporting ring 52 for relative axial adjustment permits the width of the air gap 66 to be dimensioned accurately during the initial assembly of the clutch thereby compensating for inherent manufacturing variations in the dimensions of the numerous parts affecting the width of this gap. In such assembly, the ring 52 is inserted in the core 40 and the set screws 52ª partially tightened. A shim ring 73 having a thickness equal to the desired width of the gap 66 is fitted over the sleeve 14 and brought into abutment with the back of the actuator ring as shown in Fig. 4. The ring 53 and the bearing 54, and the core assembly are then fitted onto the sleeve and pressed axially as by energizing the magnet in order to bring the inner pole face 60 into firm abutment with the shim 73 as shown in Fig. 5.

This establishes the proper relationship between the core and its supporting ring 52 which relationship is retained as the core is slid back off from the sleeve 14. The screws 52a are then tightened so as to preserve this relationship. Finally, after removal of the shim ring, the magnet core is again fitted onto the end of the sleeve 14 and pressed inwardly by the addition of the spacer 57, the spring washers 55 and the snap ring 56. With the parts thus assembled in this convenient way, all looseness between the parts of the main clutch and its actuator and between the supporting parts of the pilot clutch is eliminated. This permanent relationship obtains throughout the service life of the clutch so as to provide uniformity in its action at all times.

If desired, the supporting structure for the magnet core 40 and the actuator ring 34 may, by proper design, be utilized to carry a substantial part of the magnetic flux from the armature 43 to the inner pole leg 42 of the magnet core thus permitting the area of the inner pole face 60 to be reduced and the construction of the core thus simplified. Such a modification is shown in Fig. 6 in which the inner pole flange 64 is omitted and the pole face 60 formed by the end of the core leg 42 alone. A major part of the total flux between the armature 43 and the pole face 60 threads axially through the main flux path including the gap 66 as indicated by the line 44 while the remainder as indicated by the lines 44a and 44b by-passes this gap and threads these auxiliary flux paths radially and inwardly through the ring 34 and into the magnetic sleeve 14, then axially along the latter, and finally to the inner core leg 42 through the rings 52 and 53 which are composed of magnetic iron. To facilitate such by-passing the inner edge portion of the ring 34 may be thickened axially as shown.

I claim as my invention:

1. In a magnetic friction clutch, the combination of, a support, an annular magnetic core of U-shaped cross-section stationarily mounted on said support and having concentric outer and inner legs with flanges at the free edges thereof respectively turned inwardly and outwardly and providing axially facing pole faces offset axially from each other, a shaft extending axially of said core, a magnetic actuator ring mounted on said shaft to turn about the axis of said core and disposed adjacent said inner pole face so as to be separated therefrom by a narrow axial air gap, a thrust bearing carried by said shaft and engaging said ring to maintain said axial air gap, an armature ring larger in diameter than said first ring, means supporting said armature ring with its inner edge portion overlapping said first ring radially, and adapted for axial gripping engagement with the side of the first ring opposite said gap, the outer edge portion of said armature ring being disposed opposite and separated from said outer pole face by a narrow axial air gap, said rings and said core cooperating to provide a toroidal flux path threading axially through said core, said pole faces, said gaps and said rings, and means on said core for creating magnetic flux threading said path.

2. In a magnetic friction clutch, the combination of, a magnetic supporting sleeve, a magnetic ring closely surrounding said sleeve and supported thereby to turn about the sleeve axis, a rotatable armature ring, means mounting said armature ring adjacent said first ring for free axial floating and axial gripping engagement with said first ring, an annular magnet core of U-shaped cross-section surrounding said sleeve and having outer and inner pole legs terminating at pole faces respectively disposed opposite said armature and said first ring and separated from the two by narrow air gaps, the inner one of said gaps being disposed in an axial plane, a bearing between said sleeve and the inner leg of said core and supporting the latter for relative rotation between the core and sleeve, said core cooperating with said rings to provide a toroidal magnetic flux path threading said gaps and said bearing including a ring cooperating with said first ring and said sleeve to provide an auxiliary flux path extending between said armature and said inner core leg and by passing said axial air gap.

3. In a magnetic clutch, the combination of, a rotary shaft, a first ring of magnetic material journaled on said shaft, a thrust ring supported by said shaft and holding said first ring in a fixed axial position along said shaft, a magnet core surrounding said shaft and having an axially facing pole face disposed opposite said first ring and separated therefrom by a narrow axial gap, means supporting said core on said shaft including an anti-friction bearing having two race rings, one race ring abutting said thrust ring, the other race ring being disposed within the internal periphery of said core, coupling means selectively operable to secure said core and said second race ring rigidly together while permitting relative axial adjustment of the two, and means yieldably urging said core toward said thrust ring to maintain said gap of an axial width determined by the position of the second race ring relative to said core.

4. In a magnetic friction clutch, the combination of, a support, an axially fixed and generally flat magnetic ring mounted on said support to turn about the ring axis, a flat armature ring, means supporting said armature ring adjacent said first ring for free axial floating and to turn about the axis of the latter ring, a magnet stationarily mounted on said support and having an annular core providing two axially facing pole faces, said core and said pole faces coacting with said rings to form a toroidal flux path extending axially through two narrow gaps defined by the two pairs of opposed axially facing surfaces, one surface of each pair being formed on said magnet core and the other being on one of said rings, and means carried by said core for creating magnetic flux threading said path for drawing said rings into axial gripping engagement.

References Cited in the file of this patent

UNITED STATES PATENTS

| | | |
|---|---|---|
| 2,580,869 | Winther | Jan. 1, 1952 |
| 2,729,318 | Harter | Jan. 3, 1956 |
| 2,780,893 | Seborg et al. | Feb. 12, 1957 |
| 2,796,222 | Frankel | June 18, 1957 |
| 2,796,963 | Harter | June 25, 1957 |

FOREIGN PATENTS

| | | |
|---|---|---|
| 20,922 | Great Britain | 1912 |